United States Patent Office 3,390,174
Patented June 25, 1968

3,390,174
PROCESS FOR THE PREPARATION OF
ADIPIC ACID
Johann G. D. Schulz and Arthur C. Whitaker, Pittsburgh, Pa., assignors to Gulf Research & Development Company, Pittsburgh, Pa., a corporation of Delaware
No Drawing. Filed June 17, 1964, Ser. No. 375,951
14 Claims. (Cl. 260—533)

This invention relates to the selective preparation of aliphatic dibasic acids by the controlled efficient oxidation of a saturated cycloaliphatic hydrocarbon having the same number of carbon atoms as the dibasic acid. In particular, this invention relates to the selective preparation of adipic acid by the oxidation of cyclohexane with a gas containing molecular oxygen.

The oxidation of cyclohexane with an oxygen-containing gas to produce cyclohexanol, cyclohexanone and adipic acid is well known in the art which is complex and confusing. The art is replete with contradictions on the advisability of using solvents, catalysts, low reaction temperatures (less than 100° C.), high reaction temperatures (more than 100° C.), etc. Various theories of reaction have been proposed, but problems still remain. One of the primary difficulties of the processes in the prior art is the poor efficiencies to the desired products obtained at conversions above about 5 to 10 percent of the cyclohexane. It has now been discovered that the selectivity of the oxidation of cyclohexane to adipic acid can be greatly improved by a careful control of reaction conditions, including temperature and charge stock composition.

In accordance with the invention, improved yields of an aliphatic dibasic acid are obtained by a process which comprises oxidizing a liquid reaction mixture comprising at least one saturated cyclic hydrocarbon having between 5 and 8 cyclic carbon atoms per molecule in the presence of at least an equilibrium concentration of a cyclic alcohol corresponding to said saturated cyclic hydrocarbon and at least an equilibrium concentration of a cyclic ketone corresponding to said saturated cyclic hydrocarbon with a gas containing molecular oxygen under oxidation conditions including a temperature between about 130° C. and 160° C. while removing the water of reaction substantially as quickly as it is formed, and where in said reaction mixture the sum of the concentrations of said cyclic alcohol and said cyclic ketone is less than 50 weight percent of said reaction mixture.

The charge stock for this reaction can be any saturated cyclic hydrocarbon having between 5 and 8 cyclic carbon atoms per molecule and at least one cyclic carbon atom having two hydrogen atoms attached. Examples of suitable saturated cyclic hydrocarbons include cyclopentane; methyl cyclopentane; 1,3-dibutyl cyclopentane; cyclohexane; ethyl cyclohexane; 1,3,5- triisopropyl cyclohexane; 1-methyl, 4-octyl cyclohexane; 1,3,5-trichloro cyclohexane; cycloheptane; methyl cycloheptane; 1,1,4-trimethylcycloheptane; cyclooctane; and methylcyclooctane. The preferred charge stock is cyclohexanne.

It is an important feature of this invention in order to achieve a high selectivity to the desired aliphatic dibasic acid to oxidize the saturated cyclic hydrocarbon in the presence of at least an equilibrium concentration of the cyclic alcohol corresponding to the saturated cyclic hydrocarbon and at least an equilibrium concentration of the cyclic ketone corresponding to the saturated cyclic hydrocarbon. The equilibrium concentration of the cyclic alcohol and cyclic ketone will vary depending on reaction conditions and the specific saturated cyclic hydrocarbon charge stock, but in general the weight percent cyclic alcohol based on the total reaction mixture is between 7 and about 12, whereas the weight percent cyclic ketone based on the total reaction mixture is between about 20 and about 30. Concentrations of the cyclic alcohol or cyclic ketone greater than about 12 and 30 weight percent respectively can be present, such as by adding the alcohol or ketone to the saturated cyclic hydrocarbon but it is preferred that the total concentration of alcohol and ketone in the total reaction mixture should be less than about 50 weight percent. It is preferred to keep the total alcohol and ketone concentrations to 50 weight percent or less since this process is designed for the selective conversion of a saturated cyclic hydrocarbon to the dibasic acids rather than the conversion of cyclic alcohols and cyclic ketones to dibasic acids. This is a preferred process since normally the cyclic alcohols and ketones are more valuable than the corresponding saturated cyclic hydrocarbons. The cyclic alcohol concentration can therefore vary between about 7 and 30 weight percent of the reaction mixture with preferred concentrations between 7 and 12 weight percent while the cyclic ketone concentration can vary between 20 and 43 weight percent of the reaction mixture with preferred concentrations between about 20 and 30 weight percent. The saturated cyclic hydrocarbon can therefore vary between about 50 and 73 weight percent of the reaction mixture and is preferably between about 58 and 73 weight percent.

While it is not certain, it is believed the production of the cyclic ketone from the saturated cyclic hydrocarbon occurs by two routes, namely, from the decomposition of the cyclic peroxide (the initial product from the oxidation of cyclohexane) and by the conversion of the cyclic alcohol to the cyclic ketone. These reactions are shown in Equations 1 to 5 below:

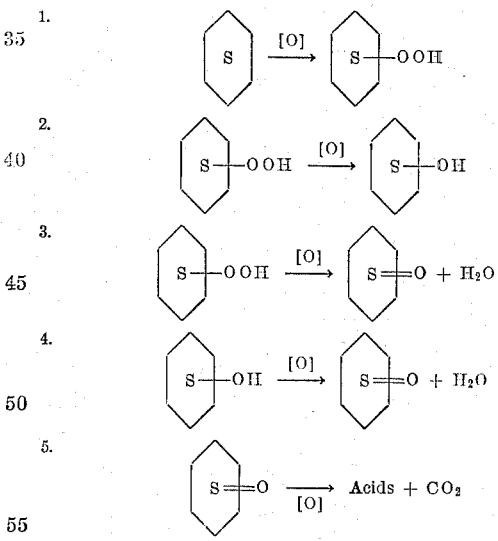

Initially, the cyclic hydroperoxide decomposes to both the alcohol and ketone (Equations 2 and 3), and a portion of the alcohol is converted to the ketone (Equation 4). Initially, the total amount of alcohol formed is about equivalent to the total amount of ketone formed. As the alcohol concentration increases, reaction 4 becomes more important and the ketone to alcohol ratio in the reaction mixture begins to increase. When the alcohol concentration reaches a certain level, there is about as much alcohol being formed by reaction 2 as is being converted to ketone by reaction 4. In addition, when the ketone concentration reaches a certain level, there is about as much ketone being formed by reactions 3 and 4 as is being converted to acids and $CO_2$ by Equation 5. This "certain level" is what is termed the "equilibrium concentration" of cyclic alcohol and the "equilibrium concentration" of cyclic ketone. It is believed this is a dynamic type of equilibrium concentration, that is, alcohol and ketone are being formed continuously, but at about the same rate as they are being converted to other products, namely, the alcohol to ketone and the ketone to acids and $CO_2$. Thus, by controlling the concentration of alcohol and ketone in the reaction mixture, the process can be made selective to the production of the desired aliphatic dibasic acids. That an "equilibrium concentration" of the cyclic alcohol and cyclic ketone would be found was quite unexpected since the oxidation reactions are thermodynamically irreversible.

The desired cyclic alcohol and ketone equilibrium concentrations can be achieved in any suitable manner. For example, the cyclic ketone and cyclic alcohol can be added directly to the saturated cyclic hydrocarbon in the desired concentration before the oxidation reaction is begun, or the desired alcohol and ketone concentrations can be achieved in situ by the oxidation of the saturated cyclic hydrocarbon until the desired concentration is reached, and thereafter continuing the oxidation of the saturated cyclic hydrocarbon in the presence of the cyclic alcohol and cyclic ketone. It has been found that the cyclic alcohol concentration appears to reach a level between about 7 and 12 weight percent of the reaction mixture and remain constant while the cyclic ketone concentration appears to reach a level between about 20 and 30 weight percent of the reaction mixture and remain constant while the weight percent acids continues to increase with continuing oxidation. If the charge stock contains no cyclic alcohol or cyclic ketone initially the reaction time would be correspondingly increased before the phenomenon of this invention would be fully realized. These findings are contrary to those of the prior art which indicate that the cyclic alcohol and cyclic ketone are produced in about equal proportions, and in order to achieve good efficiency, the total conversion of the saturated cyclic hydrocarbon must be kept low. While it is not certain, it is believed the improved process of the present invention resides in an appreciation for the first time of the interdependence and criticality of maintaining the cyclic alcohol and cyclic ketone concentrations and the reaction temperature within the narrow limits defined herein, while at the same time removing any water formed in the reaction substantially as quickly as it is found.

The reaction time can vary over a wide range depending on the reaction conditions including temperature, pressure and charge stock composition. If some cyclic alcohol and cyclic ketone are added initially to the reaction mixture, then of course less reaction time will be required to achieve the equilibrium alcohol and ketone concentrations which are required in order to selectively produce the desired aliphatic dibasic acids of this invention. As an example, when the charge stock comprises between 7 and 12 weight percent cyclohexanol, between 20 and 30 weight percent cyclohexanone, and between 58 and 73 weight percent cyclohexane, a suitable reaction time is between 1 and 20 hours, or more. When cyclohexane alone is charged, containing if desired a small amount of ketone initiator and a hydrocarbon soluble metal salt catalyst, a suitable reaction time is between about 4 and 20 hours, or more. When cyclohexane alone is the charge stock, reaction time should be sufficient to obtain at least a 30 weight percent conversion of the cyclohexane and preferably a conversion between 35 and 70 weight percent of the cyclohexane.

Another critical feature of this invention is the removal of any water formed during the reaction substantially as quickly as it is formed. If the water of reaction is permitted to remain in the reaction zone, it inhibits the oxidation of cyclohexane and eventually the reaction will stop. The presence of water even in small concentrations say between 1 and 6 weight percent of the reaction mixture tends to inhibit the production of aliphatic dibasic acids from the cyclic ketones, in accordance with the process described in the inventors' copending Serial No. 375,920 now U.S. Patent No. 3,340,304 filed concurrently herewith. Thus, it has been found that by the removal of water substantially as quickly as it is formed and by oxidizing a saturated cycloaliphatic hydrocarbon, such as cyclohexane, in the presence of an equilibrium concentration of a cyclic alcohol and cyclic ketone corresponding to said saturated cycloaliphatic hydrocarbon, the production of desired aliphatic dibasic acids is made more selective.

For simplicity the following discussion will relate to the oxidation of cyclohexane to yield primarily cyclohexanol, cyclohexanone and adipic acid. It is understood, however, that other saturated cyclic hydrocarbons having from 5 to 8 cyclic carbon atoms per molecule behave similarly in the presence of their corresponding cyclic alcohols to yield primarily the corresponding cyclic ketone.

The oxidation of cyclohexane occurs with any gas containing molecular oxygen such as oxygen, air, or oxygen enriched air. The oxygen-containing gas enters in firmly comminuted form through any suitable means, for example, through a sparger. The reaction pressure should be at least sufficient to maintain the reactants in the liquid phase. Thus, for example, the reaction pressure is generally between about 40 and 350 p.s.i.g. or higher. It is preferred that an oxygen-containing gas having at least 50 and more preferably greater than 95 percent oxygen be employed so that a low total pressure but high oxygen partial pressure is available in the reaction zone. If a total reaction pressure is greater than the pressure at which the water of reaction, i.e., a water-cyclohexane azeotrope can continuously be removed at the reaction temperature, the reaction pressure can be periodically reduced to allow the water of reaction to be removed as the azeotrope. The frequency and prolongation of pressure reduction should be such that the water concentration remains below about 1 weight percent in order to promote the selective formation of the dibasic acids.

An important feature of this invention resides in the reaction temperature employed. In order to obtain high selectivity to the production of cyclohexanone from cyclohexanol, the reaction temperature must be above about 130° C. Since the cyclohexanone is the precursor to the desired adipic acid, it is necessary to employ a temperature of at least about 130° C. It has also been found that at a reaction temperature above about 160° C., the overall reaction efficiency decreases, and thus a reaction temperature of about 160° C. is a suitable upper limit for the process of this invention. The reaction temperature can therefore vary between about 130° and 160° C. with a preferred reaction temperature between 130° and 145° C.

The oxygen-containing gas is added to the reaction mixture at a rate sufficient to maintain the desired pressure. As the reaction proceeds, oxygen is absorbed and the pressure decreases. It is also desirable to maintain an oxygen bleed on the unit so as to remove inert gases.

The process of this invention can occur in the presence or absence of a catalyst. A suitable catalyst is a hydrocarbon soluble cobalt compound, such as a cobalt salt of an organic acid having between about 2 and 20 carbon atoms per molecule, such as cobalt acetate, cobalt octanoate and cobalt naphthenate. Other suitable catalysts include the hydrocarbon soluble compounds of copper, cerium, vanadium, chromium, manganese, etc., such as copper acetate; cerium acetate; vanadium propionate; chromium naphthenate; manganese acetate; manganese octanoate, etc. The cobalt compounds are preferred. The amount of catalyst may indeed be minute, e.g. as little as 1 p.p.m. of meal, for example, in the form of a hydrocarbon soluble salt. Amounts between 1 and 1000 p.p.m. of metal as the hydrocarbon soluble salt and preferably 50 and 500 p.p.m. can suitably be employed.

The invention will be further described with reference to the following specific examples.

In all of the examples to follow, the charge stock was either 520 grams of cyclohexane or a mixture of cyclohexane, cyclohexanol and cyclohexanone. A small amount of cyclohexanone (about 1.6 grams) was added as an initiator in those runs where cyclohexane was charged alone. In all of the runs, except Example 8, the reaction temperature was 135° C. and in all runs the reaction pressure was 70 p.s.i.g. of oxygen. A small amount (either 0.05 grams or about 100 parts per million) of a cobalt naphthenate catalyst was used in all runs. The reaction procedure comprised (1) adding the charge stock to a 0.75 liter reaction vessel equipped with a temperature measuring device, an oxygen inlet sparger, a vapor outlet and means for adding and removing liquids, (2) heating the charge stock to the desired temperature, and (3) adding oxygen to achieve the desired reaction pressure. Oxygen was then continuously added through the sparger in the form of small bubbles to maintain the desired pressure. In all of the runs except for Example 3, the water of reaction was removed substantially as quickly as it was formed as a water cyclohexane azeotrope. The azeotrope was condensed and the water removed through a Dean-Stark trap while cyclohexane was recycled to the oxidation reaction zone. Reaction times between 4 and 12 hours were employed.

Example 1

In the run for this sample, 520 grams of cyclohexane were oxidized in the presence of a small amount of cyclohexanone and a catalyst, as described above, for a time period of six hours while the water of reaction was removed substantially as quickly as it was formed. The results of this run are summarized on Table I below.

acid. The results in Example 2 show that an equilibrium concentration of cyclohexanol and cyclohexanone was achieved resulting in the selective production of adipic acid.

Example 3

Example 2 was repeated except the water formed in the oxidation reaction was not removed. The results of this run are also summarized on Table I below. Referring again to Table I it can be seen that by not removing the water of reaction the total conversion drops to 38.8 percent. The cyclohexanone and cyclohexanol concentrations in the final reaction mixture were 21.7 and 5.85 weight percent respectively while the adipic acid concentration dropped sharply to only 6.9 weight percent.

A comparison of the results of Example 3 with Example 1 shows the important effect of removing the water of reaction substantially as quickly as it is formed on the production of the desired aliphatic dibasic acids. Over three times as much adipic acid is produced in Example 2 where the water of reaction is removed as in Example 3 where the water is permitted to remain in the reaction zone. This increased amount of adipic acid is obtained despite the fact that the total conversion in Example 2 is only about 1.5 times the conversion achieved in Example 3. Thus, for the selective preparation of aliphatic dibasic acids it is necessary not only to have an equilibrium concentration of cyclohexanol and cyclohexanone present in the reaction zone, but also to remove the water of reaction substantially as quickly as it is formed.

TABLE I

| Example No. | 1 | 2 | 3 | 4 | 5 | 6 | 7 | 8 |
|---|---|---|---|---|---|---|---|---|
| Reaction Conditions: | | | | | | | | |
| Temperature, °C | 135 | 135 | 135 | 135 | 135 | 135 | 135 | 125 |
| Pressure, p.s.i.g | 70 | 70 | 70 | 70 | 70 | 70 | 70 | 70 |
| Time | 6 | 12 | 12 | 4 | 6 | 6 | 6 | 4.5 |
| Charge Stock: | | | | | | | | |
| Cyclohexane (gms.) | 520 | 520 | 520 | 405.3 | 386 | 375.3 | 408 | 520 |
| Cyclohexanol (gms.) | | | | 23.9 | 39.5 | 41.9 | 37.3 | 51 |
| Cyclohexanone (gms.) | 1.8 | 1.8 | 1.8 | 53.3 | 118.1 | 127.4 | 93.9 | 1.6 |
| Catalyst, Cobalt Naphthenate | (1) | (2) | | (2) | (2) | (2) | (2) | (1) |
| Total Conversion, Wt. percent | 34 | 58.4 | 38.8 | 24.6 | 23.6 | 27.6 | 35 | 16.5 |
| Products, Unreacted: | | | | | | | | |
| Cyclohexane (gms.) | 343 | 216.1 | 318 | 305.4 | 295.0 | 272.0 | 265.0 | 434 |
| Cyclohexanone (gms.) | 93.9 | 123.2 | 111.8 | 95.9 | 127.4 | 134.8 | 118.1 | 34.6 |
| Cyclohexanol (gms.) | 37.3 | 51.8 | 30.1 | 33.9 | 41.9 | 43.6 | 39.5 | 80.5 |
| Adipic Acid (gms.) | 59.9 | 117.0 | 35.6 | 48.3 | 64.2 | 77.3 | 102.3 | 1.0 |
| Glutaric (gms.) | 12.0 | 22.0 | 11.1 | 10.8 | 19.0 | 18.1 | 26.3 | 0.0 |
| Succinic (gms.) | 6.8 | 13.1 | 8.1 | 6.2 | 11.4 | 12.8 | 16.8 | 0.0 |
| Total (gms.) | 552.5 | 543.2 | 514.7 | 500.5 | 558.9 | 558.6 | 568.0 | 559.1 |
| Concentration of Cyclohexanone: | | | | | | | | |
| Initial, Wt. percent | 0 | 0 | 0 | 15.5 | 22 | 24 | 17 | 0 |
| Final, Wt. percent | 17 | 22.7 | 21.7 | 22 | 22.8 | 24 | 20.8 | 6.2 |
| Cyclohexanol: | | | | | | | | |
| Initial, Wt. percent | 0 | 0 | 0 | 4.5 | 7.3 | 7.9 | 6.9 | 8.9 |
| Final, Wt. percent | 6.75 | 9.55 | 5.85 | 7.8 | 7.5 | 7.8 | 6.9 | 16.0 |
| Adipic Acid, Wt. percent | 10.8 | 21.6 | 6.9 | 9.65 | 11.5 | 13.8 | 18.0 | 0.18 |

[1] 0.05 grams.
[2] 100 parts per million.

Referring to Table I, it can be seen that a total conversion of cyclohexane of 34 weight percent was achieved and the final cyclohexanone and cyclohexanol concentrations were 17 and 6.75 weight percent of the reaction mixture respectively. The adipic acid concentration in the final reaction mixture was 10.8 weight percent.

Example 2

Example 1 was repeated except the reaction time was extended to 12 hours. The results of this run are also summarized on Table I below. The total conversion of cyclohexane increased to 58.4 weight percent while the final cyclohexanone and cyclohexanol concentrations were 22.7 and 9.55 weight percent respectively. The weight percent adipic acid in the final reaction mixture increased significantly to 21.6 weight percent.

Comparing the results of Example 2 with Example 1 shows that although a great increase in conversion occurred by increasing the reaction time from 6 to 12 hours, a relatively small increase in the amount of cyclohexanol and cyclohexanone was obtained compared to a very large increase in the production and concentration of adipic Example 4

Example 1 was repeated except the charge stock was a mixture of cyclohexane, cyclohexanol and cyclohexanone wherein the concentration of cyclohexanol and cyclohexanone was 4.5 and 15.5 weight percent respectively; and the reaction time was reduced to four hours. The results of this run are also summarized in Table I above. The total conversion of the cyclohexane was 24.6 weight percent. The cyclohexanol and cyclohexanone concentrations in the final reaction mixture were 7.8 and 22 weight percent respectively. The adipic acid concentration in the final reaction was 9.65 weight percent.

Example 5

Example 1 was repeated except the charge stock was a mixture of cyclohexane, cyclohexanol and cyclohexanone wherein the weight percent cyclohexanol and cyclohexanone was 7.3 and 22 respectively. The results of this run are summarized in Table I above. A total conversion of cyclohexane of 23.6 weight percent was achieved resulting in a final cyclohexanol and cyclohexanone concentration of 7.5 and 22.8 weight percent respectively. The adipic acid concentration in the final reaction mixture was 11.5 weight percent.

Example 6

Example 5 was repeated except the composition of the charge stock was altered slightly so that the weight percent cyclohexanol and cyclohexanone in the initial charge mixture was 7.9 and 24 weight percent respectively. The conversion of cyclohexane was 27.6 weight percent resulting in a final cyclohexanol and cyclohexanone concentration of 7.8 and 24 respectively. The adipic acid concentration in the final reaction mixture was 13.8 weight percent.

Example 7

Example 5 was repeated except again the charge stock was changed slightly and the cyclohexanol and cyclohexanone concentration in the charge was 6.9 and 17 weight percent respectively. A total conversion of cyclohexane was 35 weight percent resulting in a final cyclohexanol and cyclohexanone concentration of 6.9 and 20.8 weight percent respectively. The adipic acid concentration in the final reaction mixture was 18.

A comparison of Examples 4 and 5 shows that for about the same conversion level, greater amounts of adipic acid, glutaric and succinic acids are produced when the cyclohexanol and cyclohexanone concentrations in the original charge mixture are greater than 7 and 20 weight percent respectively.

A comparison of the results in Examples 5, 6 and 7 shows that for increasing conversions for charge stocks containing approximately the equilibrium concentrations of cyclohexanol and cyclohexanone increased amounts of the desired aliphatic dibasic acids are produced.

Example 8

In the run for this example, a charge stock comprising 520 grams of cyclohexane and 51 grams of cyclohexanol plus a small amount of cyclohexanone and catalyst was oxidized as described above for 4.5 hours at 125° C. The results of this run are also summarized on Table I above.

Referring to Table I, a comparison of Example 8 with the other examples, shows the criticality of reaction temperature for the production of the desired aliphatic dibasic acids. At 125° C., apparently the production of cyclohexanol is greatly favored and very little cyclohexanone is produced. Since the production of the aliphatic dibasic acids is dependent on the initial formation of the ketone, a temperature of 125° C. is too low for the process of this invention where the aliphatic dibasic acids are desired.

Resort may be had to such variations and modifications as fall within the spirit of the invention and the scope of the appended claims.

We claim:

1. A process for the selective preparation of an aliphatic dibasic acid which comprises oxidizing a liquid reaction mixture comprising at least one saturated cyclic hydrocarbon having between 5 and 8 cyclic carbon atoms per molecule in the presence of at least an equilibrium concentration of a cyclic alcohol corresponding to said saturated cyclic hydrocarbon and at least an equilibrium concentration of a cyclic ketone corresponding to said saturated cyclic hydrocarbon under oxidation conditions including a temperature between 130° and 160° C. with a gas containing at least 50 percent molecular oxygen while removing the water of reaction substantially as quickly as it is formed, and where in said reaction mixture the sum of the concentrations of said cyclic alcohol and said cyclic ketone are less than 50 weight percent of said reaction mixture.

2. A process for the selective preparation of adipic acid which comprises oxidizing a liquid reaction mixture comprising cyclohexane in the presence of at least an equilibrium concentration of cyclohexanol and at least an equilibrium concentration of cyclohexanone with a gas containing at least 50 percent molecular oxygen under oxidation conditions including a temperature between about 130° and 160° C. while removing the water of reaction substantially as quickly as it is formed, and where in said reaction mixture that sum of the concentrations of said cyclohexanol and said cyclohexanone are less than 50 weight percent of said reaction mixture.

3. A process for the selective preparation of an aliphatic dibasic acid which comprises oxidizing a liquid reaction mixture comprising between 50 and 73 weight percent of the saturated cyclic hydrocarbon having between 5 and 8 cyclic carbon atoms per molecule; between 7 and 30 weight percent of a cyclic alcohol corresponding to said saturated cyclic hydrocarbon and between 20 and 43 weight percent of a cyclic ketone corresponding to said saturated cyclic hydrocarbon, with a gas containing at least 50 percent molecular oxygen under oxidation conditions including a temperature between about 130° C. and 160° C. while removing the water of reaction substantially as quickly as it is formed.

4. A process for the selective preparation of adipic acid which comprises oxidizing a liquid reaction mixture comprising between 50 and 73 weight percent cyclohexane, between 7 and 30 weight percent cyclohexanol, and between 20 and 43 weight percent cyclohexanone with a gas containing at least 50 percent molecular oxygen under oxidation conditions including a temperature between about 130° C. and 160° C. while removing the water of reaction substantially as quickly as it is formed.

5. A process for the selective preparation of adipic acid which comprises oxidizing a liquid reaction mixture comprising cyclohexane with a gas containing at least 50 percent molecular oxygen for a time sufficient to obtain a cyclohexanol concentration between 7 and 12 weight percent of the reaction mixture and a cyclohexanone concentration between 20 and 30 weight percent of the reaction mixture, the total concentration of cyclohexanol and cyclohexanone being less than 50 weight percent of said reaction mixture and thereafter continuing the oxidation of said reaction mixture while removing the water of reaction substantiallly as quickly as it is formed to selectively produce the desired aliphatic dibasic acids under oxidation conditions including a temperature between 130° and 160° C.

6. A process for the selective preparation of adipic acid which comprises oxidizing a liquid reaction mixture comprising cyclohexane in the presence of at least an equilibrium concentration of cyclohexanol and at least an equilibrium concentration of cyclohexanone and a hydrocarbon soluble oxidation catalyst with a gas containing at least 50 percent molecular oxygen under oxidation conditions including a temperature between about 130° and 160° C. while removing the water of reaction substantially as quickly as it is formed, and where in said reaction mixture the sum of the concentrations of said cyclohexanol and said cyclohexanone are less than 50 weight percent of said reaction mixture.

7. A process according to claim 6 wherein the hydrocarbon soluble oxidation catalyst is hydrocarbon soluble compound of cobalt.

8. A process for the selective preparation of an aliphatic dibasic acid which comprises oxidizing a liquid reaction mixture comprisng between 50 and 73 weight percent of a saturated cyclic hydrocarbon having between 5 and 8 cyclic carbon atoms per molecule; between 7 and 30 weight percent of a cyclic alcohol corresponding to said saturated cyclic hydrocarbon and between 20 and 43 weight percent of a cyclic ketone coresponding to said saturated cyclic hydrocarbon and a hydrocarbon soluble oxidation catalyst, with a gas containing at least 50 percent molecular oxygen under oxidation conditions including a temperature between about 130° C. and 160° C. while removing the water of reaction substantially as quickly as it is formed.

9. A process according to claim 8 wherein the hydrocarbon soluble oxidation catalyst is a hydrocarbon soluble compound of cobalt.

10. A process for the selective preparation of adipic acid which comprises oxidizing a liquid reaction mixture comprising between 58 and 73 weight percent cyclohexane, between 7 and 12 weight percent cyclohexanol, between 20 and 30 weight percent cyclohexanone and a hydrocarbon soluble compound of cobalt in a reaction zone with a gas containing at least 50 percent molecular oxygen under oxidation conditions including a temperature between about 130° and 160° C. while removing the water of reaction substantially as quickly as it is formed as a cyclohexane-water azeotrope, condensing said azeotrope, separating the cyclohexane from said azeotrope and recycling said cyclohexane to said reaction zone.

11. A process according to claim 10 wherein said hydrocarbon soluble compound of cobalt is cobalt naphthenate.

12. A process for the selective preparation of adipic acid which comprises adding cyclohexanol and cyclohexanone to a reaction mixture comprising cyclohexane and a hydrocarbon soluble compound of cobalt so that said reaction mixture comprises between 7 and 12 weight percent cyclohexanol and between 20 and 30 weight percent cyclohexanone and thereafter oxidizing said reaction mixture in the liquid phase with a gas containing at least 50 percent molecular oxygen under oxidation conditions including a temperature between 130° and 160° C. while removing the water of reaction substantially as quickly as it is formed.

13. A process according to claim 12 wherein the hydrocarbon soluble compound of cobalt is cobalt naphthenate and the reaction temperature is between 130° and 145° C.

14. A process for the selective preparation of adipic acid which comprises oxidizing a liquid reaction mixture comprising cyclohexane with a gas containing at least 50 percent molecular oxygen while removing the water of reaction substantially as quickly as it is formed for a time sufficient to obtain a conversion of the cyclohexane of at least 30 weight percent, and thereafter continuing the oxidation of said reaction mixture while removing the water of reaction substantially as quickly as it is formed to selectively produced the desired aliphatic diabasic acids under oxidation conditions including a temperature between 130° and 160° C.

References Cited

UNITED STATES PATENTS

| 2,223,494 | 6/1939 | Loder | 260—586 |
| 2,285,914 | 6/1942 | Drossbach | 260—531 |
| 2,825,742 | 2/1954 | Schueler et al. | 260—533 X |

FOREIGN PATENTS 565,636   10/1944   Great Britain.

OTHER REFERENCES

Berezin et al., "Oxidation of Cyclohexanone and Cyclohexanol Mixtures to Adipic Acid," Chemical Abstracts, vol. 53 (1959), p. 16,953e.

HENRY R. JILES, *Primary Examiner.*

S. B. WILLIAM, D. STENZEL, *Assistant Examiners.*